Dec. 22, 1953     G. F. RITTER     2,663,071
ABRASIVE TOOL
Filed Jan. 13, 1951
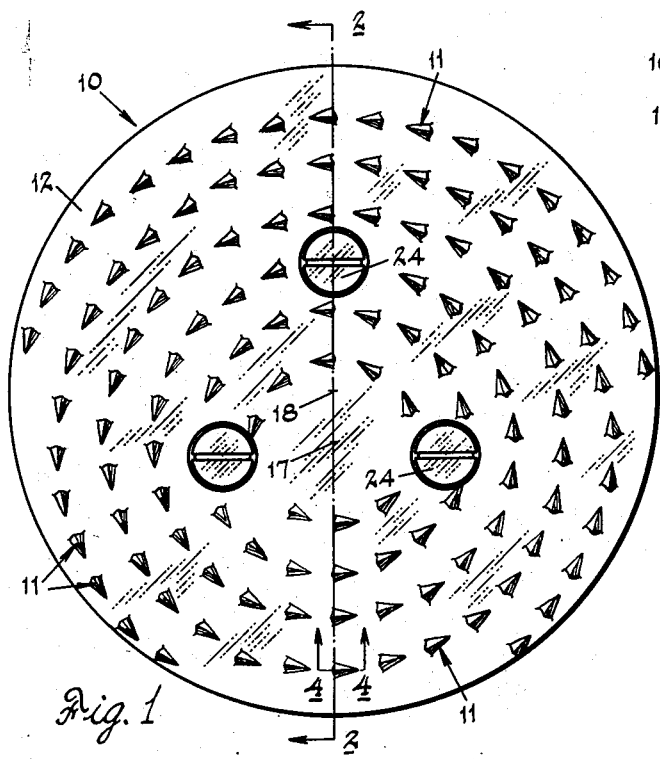
Fig. 1
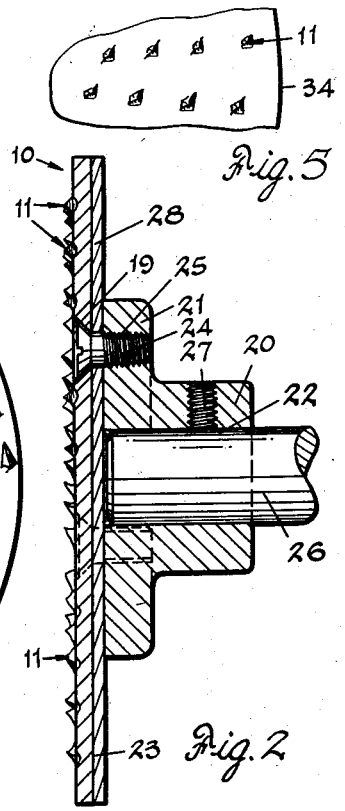
Fig. 5
Fig. 2
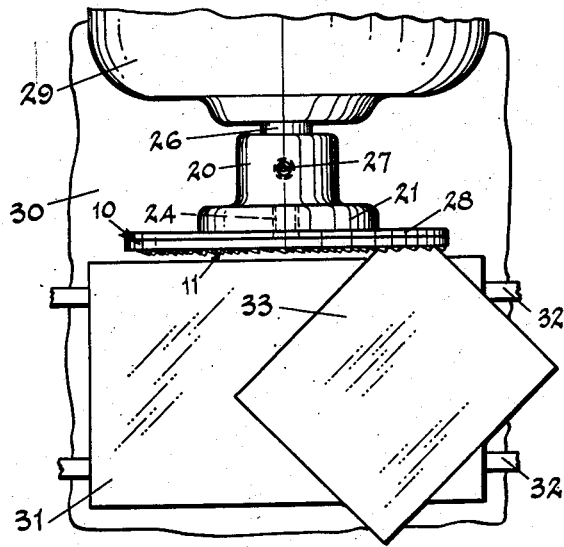
Fig. 3
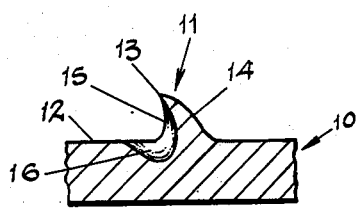
Fig. 4
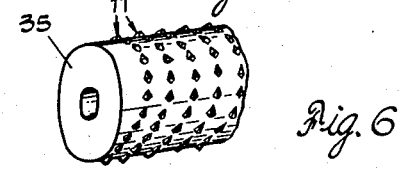
Fig. 6
INVENTOR
George F. Ritter
BY
Nobbe & Swope
ATTORNEYS Patented Dec. 22, 1953

2,663,071

UNITED STATES PATENT OFFICE 2,663,071

ABRASIVE TOOL

George F. Ritter, Toledo, Ohio

Application January 13, 1951, Serial No. 205,935

2 Claims. (Cl. 29—78)

The present invention relates broadly to abrasive or cutting tools, and more particularly to improved, rotary type, power driven tools of this general character.

Although definitely not limited to any particular shape or use, the invention has to date found its most valuable commercial application when embodied in a disc shaped cutting or abrasive tool to be used in the general manner of the conventional sanding disc in home workshops.

Briefly stated, this preferred embodiment of the invention comprises a disc shaped body portion, carried on a suitable shaft, and having a plurality of rasp type teeth struck up from its front or working face, which teeth are arranged in an irregular or eccentric pattern thereon with respect to the center of the disc.

The primary object of the invention is to provide an abrasive tool of the rotary, power driven type having a remarkably high speed cutting action.

Another object is the provision of a long lived tool of this general character that will abrade wood, metal or other materials rapidly, quietly, smoothly and uniformly.

Another object is to provide a rotary tool having a self cleaning, toothed cutting surface that will not clog or fill up even when abrading soft, sticky, sap wood.

Another object is the provision of a toothed cutting surface on such a tool in which each tooth engages the work along a different path from the immediately preceding and the immediately following tooth.

Another object is to provide a disc shaped, rotary, power driven abrading tool having a working face provided by a plurality of rasp teeth struck up therefrom, and arranged in an irregular, offset or eccentric pattern relative to the axis of rotation of the disc.

Still another object is the provision of an abrading tool of the above character in which each of the struck up rasp teeth lies at an angle to the periphery of the disc.

Other objects and advantages of the invention will become more apparent during the course of the following description, when taken in connection with the accompanying drawings.

In the drawings, wherein like numerals are employed to designate like parts throughout the same:

Fig. 1 is a front elevation of a tool constructed in accordance with the invention, and mounted on the end of a suitable drive shaft;

Fig. 2 is a section taken substantially along the line 2—2 in Fig. 1, showing one form of mounting for the tool;

Fig. 3 is a plan view of an abrading machine embodying the tool of Figs. 1 and 2;

Fig. 4 is an enlarged fragmentary, sectional view taken substantially along the line 4—4 of Fig. 1, showing one of the struck up rasp type teeth in detail;

Fig. 5 is a fragmentary face view of an abrading disc, showing the teeth arranged at an angle to the circumference of the disc; and Fig. 6 is a modification, showing the invention embodied in a cylindrical type abrading tool.

Referring now more particularly to the drawings, there is illustrated in Figs. 1 to 5 a preferred form of my invention. As there shown the abrasive tool, indicated generally by the numeral 10, is in the form of a disc having rasp-type teeth 11 struck up from a front surface 12 thereof to provide a working or abrading face, and arranged in a special manner calculated to give an unusually efficient cutting or abrading action.

In producing the tool, I prefer a disc of metal that is sufficiently malleable to permit the teeth 11 to be struck up from the surface thereof because, while these teeth may be formed on or secured to the face of the disc in any of the previously known ways, the relatively simple method of forming my abrading tool by striking the teeth upwardly from the working surface constitutes an important feature of my invention.

To illustrate, the abrasive tools of the drawings can be quickly and easily produced by any well known scarifying instrument, such as a sharp pointed metal punch. To this end it is only necessary to arrange the punch with the pointed end thereof in contact with the surface of the disc, while holding the punch at an angle thereto, and to then strike the free end of the punch a sharp blow with a hammer, in order to produce the particular kind of rasp-type tooth best shown in Fig. 4.

It will be noted that this tooth, as illustrated, has a sharp pointed end 13, remote from the surface 12 of the disc; a surface 14 facing away from the disc that is generally convex; a surface 15 facing toward the disc that is generally concave; and terminates at the surface 12 in a slight depression 16.

In using a hand scarifying instrument, such as has just been described, the operation will have to be repeated as many times as necessary to produce the desired number of teeth. However, by employing a machine embodying a plurality of simultaneously or successively operating scarifying instruments, all of the required teeth can be struck up in a very short time.

In any event, while a random arrangement of teeth can be used, it is preferred to locate them in a definite pattern on the disc in order to obtain the best results. No particular pattern is essential, but it is desired to have the teeth arranged in a linear pattern and so that each tooth will engage the work along a different path than the immediately preceding and the immediately following tooth when the disc is rotated in contact with the work.

This can be done in a number of different ways. For example, by a spiral arrangement of teeth and, while it is generally preferred to use a curved line pattern, straight line patterns, such as polygons of various regular and irregular shapes can also be used. In fact, any arrangement which presents the teeth in an irregular or eccentric pattern on the disc, with respect to the center thereof, will give reasonably good results.

However, I have found in actual practice that the most satisfactory arrangement from all standpoints of both production and use is the pattern shown in Fig. 1 of the drawings, and in which the teeth are arranged in concentric circles around a point 17 that is offset from the center 18 of the disc.

The circular rows of teeth may be placed much closer together than illustrated in the drawing, but it will be noted that successive teeth in the same circular row are spaced an appreciable distance from one another to give a skip-tooth effect. This is extremely important in preventing clogging or filling of the abrasive surface, and renders the teeth self-cleaning even when the tool is used to abrade soft, sticky pine or sapwood.

After the teeth have been struck up on the surface 12 of the disc the tool is ready for use, and will be found to have a remarkably long life when used in just this way. However, I prefer to temper or harden the metal after forming the teeth, and this may be done by any of the well known metal hardening processes. Especially good results are obtained by hardening the surface only of the disc, leaving the core relatively soft or malleable.

It is of course necessary to provide means for mounting the tool of the invention on a suitable shaft for rotation during use, and this can be done in a number of ways. Perhaps the simplest is to provide a plurality of holes 19 in the disc blank and one of the features of the invention is the provision of a special adaptor and silencing pad. These are best illustrated in Figs. 2 and 3 and as shown there the adaptor comprises a bushing 20, which may be of cast iron, having an annular flange 21. By the provision of a suitable supply of these adaptors, having openings 22 of various sizes and both straight and tapered, the abrasive disc of the invention can be accommodated on all types of machines.

Having selected the proper adaptor, it is mounted against the rear face 23 of the disc by machine screws 24 passing through the holes 19 and being threaded into the tapped holes 25 of the annular flange 21. The complete abrading tool, including the disc and its adaptor is then mounted on the end of the shaft 26 of a machine by sliding the adaptor onto the shaft and securing it in place by the set screw 27. I have also found that the tool will run much more quietly and smoothly by interposing a silencing pad 28, which may be of any suitable compressible material, such as cardboard, between the disc and the adaptor, before securing the assembly together.

In Fig. 3 there is illustrated a conventional machine into which the abrading tool of my invention can be embodied. In this case the shaft 26 is the drive shaft of an electric motor 29 which can be supported in any suitable manner as on a work bench 30 or the like. A support 31 for the work is mounted in front of the motor and may be either stationary, or adapted to move on rails 32.

In operation, the motor is started to rotate the abrasive tool 10 at a high rate of speed and the work, indicated at 33, is then placed on the support 31 and moved into contact with the working face 12 of the tool.

As indicated above, the tool of the invention has thus far found its most practical application for use in a manner similar to that in which a sanding disc is used in home workshops. Now it is well known that the conventional sanding discs have a limited ability to cut or abrade surfaces, even of wood. Moreover, while relatively cheap to buy, they are expensive to use because they wear out very quickly, and their abrading surfaces clog up rapidly, especially when working with soft wood.

The tool of this invention, on the other hand, is inexpensive to operate because, while higher in original cost, it is so long lived as to be practically a permanent fixture, and it does an incalculably better job.

As a matter of fact, its action cannot properly be compared to that of a sanding disc at all. It will cut or abrade all sorts of materials with a speed that is entirely outside the range of any sandpaper, and yet leaves a surprisingly smooth and even surface on the work. In addition, it is completely self-cleaning and never becomes clogged or filled.

To illustrate, I have, in my own workshop, quickly and quietly completely abraded away 10 feet of pine 2 x 4, employing the disc as described, with no necessity of cleaning the tool or any appreciable wear on it. Similar results were attained with blocks of polymerized polymethyl methacrylate (one of the most difficult materials to abrade without clogging the tool), and other selected 2 x 4's that were knotty and literally sticky with pitch.

I have also discovered that even better results than those already described can be obtained by arranging the teeth 11 in the manner illustrated in Fig. 5 of the drawings, that is, by positioning them in the pattern so that they lie at an angle to the periphery 34 of the disc, or to its path of rotation, instead of substantially parallel thereto as shown in Fig. 1.

It will of course be appreciated that, while I have here described my invention in connection with a disc type abrading tool, the various features can also be incorporated into other forms of rotary tools of this same general character. For example, there is illustrated in Fig. 6 a cylindrical form of tool 35 having teeth 11 of the same type, and arranged in a corresponding manner, to that described above. Thus, in this modified form, the teeth 11 may be positioned at an angle to the circumference of the cylinder rather than at an angle to the periphery of a disc.

By making the tool 33 in other specific forms, such as a paraboloid, or the like, it can, although still generally cylindrical in form, be employed to shape as well as to abrade the work.

In fact, it is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

I claim:

1. A disc shaped abrading tool having a work face, and rasp-type teeth rising from said face at intervals not materially less than twice the length of one of said teeth to provide a skip-tooth effect and arranged in a pattern of substantially concentric circles about a point offset from the center of said disc.

2. As an abrading tool, a disc adapted to be rotated in use, rasp-type teeth rising from the front face of said disc at intervals substantially equal to the length of two of said teeth to provide a skip tooth effect and so arranged relative to one another that each tooth is in substantial alignment with at least two others but upon rotation of the tool will travel in a different path from that traveled by any immediately preceding and immediately following tooth, an adaptor for mounting said disc on a driven shaft secured to the rear face of said disc, and a compressible pad between said adaptor and said disc.

GEORGE F. RITTER.

References Cited in the file of this patent

UNITED STATES PATENTS

| Number | Name | Date |
|---|---|---|
| 94,503 | Nicholson | Sept. 7, 1869 |
| 499,619 | Weed | June 13, 1893 |
| 507,071 | Huff | Oct. 17, 1893 |
| 955,252 | Cronin | Apr. 19, 1910 |
| 2,068,622 | Ufer | Jan. 19, 1937 |
| 2,194,525 | Nordberg | Mar. 26, 1940 |

FOREIGN PATENTS

| Number | Country | Date |
|---|---|---|
| 152,836 | Great Britain | Oct. 28, 1920 |
| 286,504 | Italy | June 13, 1931 |
| 641,587 | France | Oct. 7, 1928 |
| 697,773 | France | Jan. 22, 1931 |
| 705,546 | Germany | May 2, 1941 |
| 850,660 | France | Dec. 22, 1939 |